(12) United States Patent
Chenier et al.

(10) Patent No.: US 6,445,163 B1
(45) Date of Patent: Sep. 3, 2002

(54) BATTERY CUTOFF TIMER

(75) Inventors: E. Glen Chenier, Allen; Douglas W. Darlington; Ronald D. Luque, both of Plano; Marcel Vezeau, Richardson, all of TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/692,070

(22) Filed: Oct. 19, 2000

(51) Int. Cl.[7] .................................................. H02J 7/00
(52) U.S. Cl. ........................................ 320/133; 320/130
(58) Field of Search ................................. 320/133, 130; 324/415, 418; 361/101

(56) References Cited

U.S. PATENT DOCUMENTS 5,304,935 A * 4/1994 Rathka et al. ............... 324/415
6,202,162 B1 * 3/2001 Katamoto et al. .......... 713/320

\* cited by examiner

*Primary Examiner*—Gregory Toatley
*Assistant Examiner*—Lawrence Luk
(74) *Attorney, Agent, or Firm*—Baker Botts L.L.P.

(57) ABSTRACT

The invention provides a method and system for managing electrical power flow among a plurality of loads or devices, which can be classified into critical loads (as to which maintaining power flow for a maximal period is a priority) and non-critical loads (as to which power flow may be cutoff when available power becomes limited). The invention is of particular use for rationing backup battery power among a plurality of data communications or telecommunications devices or services, whereby one or more less-crucial, and perhaps power-intensive, devices may be provided with a guaranteed duration of backup battery power (to perform an orderly shutdown, for instance), while a more-crucial, and perhaps less power-intensive, device is supplied with a longer duration of backup battery power, such that as the unavailability of primary power continues, crucial functions are maintained. The ability to define exactly the duration of the non-critical devices' use of backup power is important to managing limited system resources, and can also be useful for protecting the backup storage batteries from excessive drain.

24 Claims, 7 Drawing Sheets

BATTERY CUTOFF TIMER

BACKGROUND OF THE INVENTION

The present invention relates to electric power supplies for electronic equipment, and in particular to methods and systems for managing battery backup power for systems involving telecommunications and other data-processing equipment and networks.

Telecommunications and data processing equipment and networks typically use electrical power. The electrical power may be most commonly supplied, in the first instance, by the public electric power grid, i.e., by commercial power utilities. It may also be supplied by dedicated electrical generators.

Regardless of the source of electrical power, such sources cannot be considered fully reliable. Even the most well-maintained commercial power utilities, for instance, may experience from time to time cessations in service; for instance, because of extraordinarily high demand, or due to lightning strikes, transformer failures, circuit breaker trippings, and other phenomena that may affect electrical supply networks.

Power outages in the default electrical supply network may be of considerable detriment to a telecommunications or data processing network. Thus, various provisions are made by telecommunications and other network providers or infrastructure managers, or by customers, for ensuring that a backup power supply source is available. For instance, it would be highly undesirable for voice telephone service (referred to in the industry as "POTS") to become unavailable each time the local electric power supply experienced a transient or lasting outage. Among other things, access to emergency police/medical/fire or "911" service could be disrupted or impaired. Such a result is unacceptable from a technical or public policy standpoint. As a rule of thumb, those who manage telecommunications systems and networks have the goal of ensuring that POTS or "lifeline" service will be available at least 99.999% of the time, and that backup power supplies will be available for POTS to ensure such service for a guaranted period, typically eight (8) hours of continuous power outage.

It is known that most outages in public electric power networks will be of duration less than eight (8) hours. Further, it has been observed that most power outages fall into two broad categories; (a) transient outages caused by, e.g., circuit breaker trips (which can be cleared by automatic resetting of a breaker or re-routing of power, typically within a few minutes of the outage beginning); and (b) prolonged outages, i.e., those involving serious equipment failures or other problems that cannot be remediated automatically and that require a work crew to be dispatched to perform physical repairs on power lines, transformers, etc. at one or more remote sites. Such prolonged outages may be expected to last in the neighborhood of several hours.

Storage batteries (whether single batteries or a large group of batteries) provide perhaps the most effective form of backup power supply for telecommunication and data network equipment. Storage batteries may be maintained for backup by an individual corporate end user of the network, or by the network provider, or both, as desired. They are obviously also useful in the context of private networks, LANS, intranets, etc.

However, as storage batteries have a finite capacity or energy reserve, it is important to be able to measure the time for which effective power can be delivered by the backup storage batteries. In this connection, the aforementioned requirements for overall power reliability in the context of POTS are complicated by the fact that certain modern telecommunication or data networks may comprise a plurality of discrete services. For instance, a telecommunications network provider or servicer may provide both POTS and Digital Subscriber Line (DSL) data service to its end users, often over the same basic network. However, the POTS service and DSL data service may be transmitted in conjunction with separate servers or switches. These servers and switches may have differential power requirements. For instance, it is known that DSL requires greater electrical power than POTS (in part because a basic voice telephone signal is of comparatively small bandwidth compared to high-bandwidth, multiplexed data streams). Thus, maintaining backup power over an extended period for a DSL system will require far greater backup/battery capacity than providing backup power for POTS for the same duration.

Additionally, the "mission critical" nature of discrete telecommunications services may differ. As previously mentioned, there is a great emphasis on maintaining fully-reliable POTS service for all customers; while DSL service may of course be important to an end user, it is not generally deemed so mission critical, or so important to maintain as a lifeline service for all network users. Accordingly, given a choice, network providers will generally choose to dedicate the bulk of their efforts to reliable power backups toward guaranteeing maximal availability of one primary service (for instance POTS), while maintaining the best-possible, but lower-priority, power backup as to one or more secondary services. Essentially, the limited capacity of battery backup power requires prioritizing the competing demands for power from network service and equipment. For instance, most network administrators would accept a battery backup system that provided only enough battery backup power to power DSL service for typically one (1) hour or less of unavailability of outside power. This time period would provide a buffer zone that would maintain DSL service during the short-duration type of external power outage, though it could not guarantee full DSL service availability for a longer-duration power outage of perhaps several hours. Still, in a network comprising both POTS and DSL service, the ability to dedicate most of the backup power resources to providing uninterrupted POTS availability for up to eight (8) hours, while providing at least the selected or engineered (e.g., one (1) hour) backup period for DSL, would allow an orderly system shutdown of DSL/intranet or other data services, thus limiting damage to the network and end users and preserving communications and data integrity to a reasonable extent.

Prior art attempts at prioritizing power demand or managing backup power to optimize performance of a multi-component or multi-service data or telecommunications network, while protecting battery integrity, have not been fully satisfactory. In the past, low-voltage disconnect switches have been used to disconnect power loads from a backup battery (or group of batteries) when the voltage diminished below a certain point. While voltage deterioration provides a good rough estimate of decreasing battery charge and/or the threat of over-draining the battery, low-voltage disconnect switches have the disadvantage that they do not necessarily provide a fully predictable duration of backup power. Rather, the switch disconnects one or more loads automatically upon a prescribed voltage diminution.

In connection with such a system, and given the desirability of being able to predict with accuracy the particular amount of backup time to be devoted to each system or network resource or service, it would not be possible to guarantee any exact backup time for all services. Rather, at best, one could estimate the time at which battery output voltage would decrease to the switchoff threshold (say, 47 Volts, which corresponds with roughly eighty percent (80%) of beginning voltage) under estimated use conditions, and define this time as an estimated cutoff time. However, this is not a fully satisfactory approach because: (a) it does not provide a guaranteed backup time for the secondary device or service, but rather simply an estimated backup time, such that a premature cutoff could take place if the estimate were incorrect (causing such problems as, for instance, interruption of an orderly DSL shutdown initiated with the expectation that slightly or substantially more backup power would be available than actually occurred); and (b) the estimate of time to drain enough power such that the output voltage reduces to the predetermined value (say the 47 Volt level corresponding to 80% of peak battery output) cannot be fully precise given the variability of the loads placed on the backup battery, and other usage-related variables.

Accordingly, it would be desirable to provide a backup battery power management method and device that allowed for a guaranteed duration of backup power to one or more power loads within a telecommunications or data network, whereupon at least one of the loads would be disconnected from the battery backup, thus preserving the battery from additional drain from that load. It would further be desirable to apply such a backup battery power management device or method for prioritizing among a plurality of more important and less import ant loads, such as crucial POTS loads and less-crucial DSL loads in a telecommunications network. It would also be desirable to provide such backup battery power management in adaptable format, such that it could be implemented by a network manager or provider, telecommunications company, or end-user (or some combination of such entities), such that it could be configured for user-customizable time intervals and in conjunction with system- and load-specific power management needs, and for optimal preservation of system integrity and battery integrity. It would further be desirable to provide such a backup battery power management technology using affordable components and in a fashion compatible with existing configurations of telecommunications and data networks and with existing battery backup configurations. The prior art does not adequately meet these needs.

SUMMARY OF THE INVENTION

The invention herein disclosed is a method and system for providing backup battery power management. The present invention permits provision of a guaranteed duration of backup power to one or more power loads within a telecommunications or data network. At the end of the predetermined duration, at least one non-priority load may be disconnected from the battery backup, thus preserving the battery from additional drain from that load. The present invention also allows prioritizing among a plurality of more important and less important loads, such as crucial POTS loads and less-crucial DSL loads in a telecommunications network, so that the time at which a more-crucial load is disconnected from backup power can be later, and the time at which a less-crucial load is disconnected from backup power may take place at an earlier, and pre-determined, time. The present invention further provides such backup battery power management in adaptable format, and may be implemented as is convenient by a network manager or provider, telecommunications company, or end-user (or some combination of such entities), such that it is configurable for user-customizable time intervals and in conjunction with system- and load-specific power management needs, and for optimal preservation of system integrity and battery integrity. The present invention utilizes affordable components and is adaptable for use with existing configurations of telecommunications and data networks and with existing battery backup configurations. The present invention is particularly useful in connection with telecommunications networks and equipment, such as that used to deliver a plurality of voice and data streams of differing power and reliability needs, for instance POTS and DSL, but could find applicability in managing power for any group of devices or services having power requirements.

The present invention, generically described, employs a timed power switch for cutting off battery power to a secondary or non-priority load or loads after a predetermined period of time following a failure of external power supply. In this connection, the present invention is able to receive a user-defined setting of a predetermined backup time, detect an external power failure event, allow power flow to a non-priority load for the predetermined time, and cutoff power flow to the non-priority load once the predetermined time has elapsed.

DETAILED DESCRIPTION OF THE PREFERRED EMBODIMENTS

Overview

Figure 1:
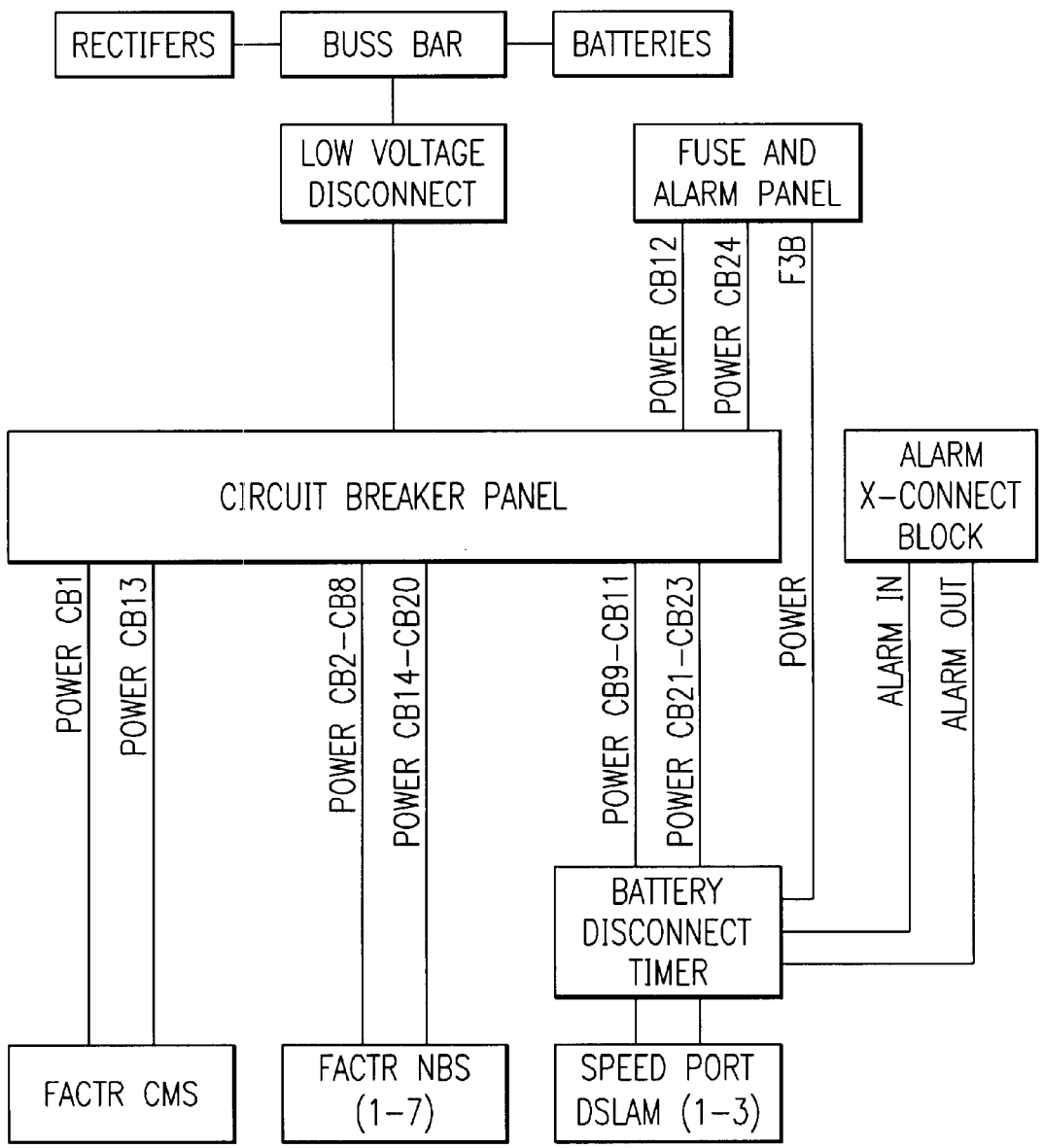
FIG. 1 provides a high-level block diagram of the battery cutoff timer of the present invention.
Figure 6:
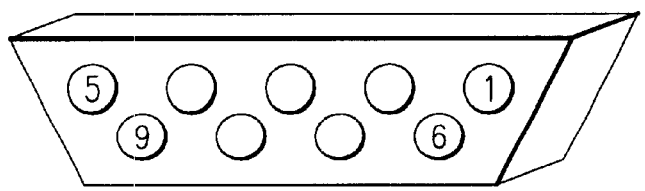
FIG. 6 depicts DB9 connector pin layouts for the battery cutoff timer of the present invention.
Figure 2:
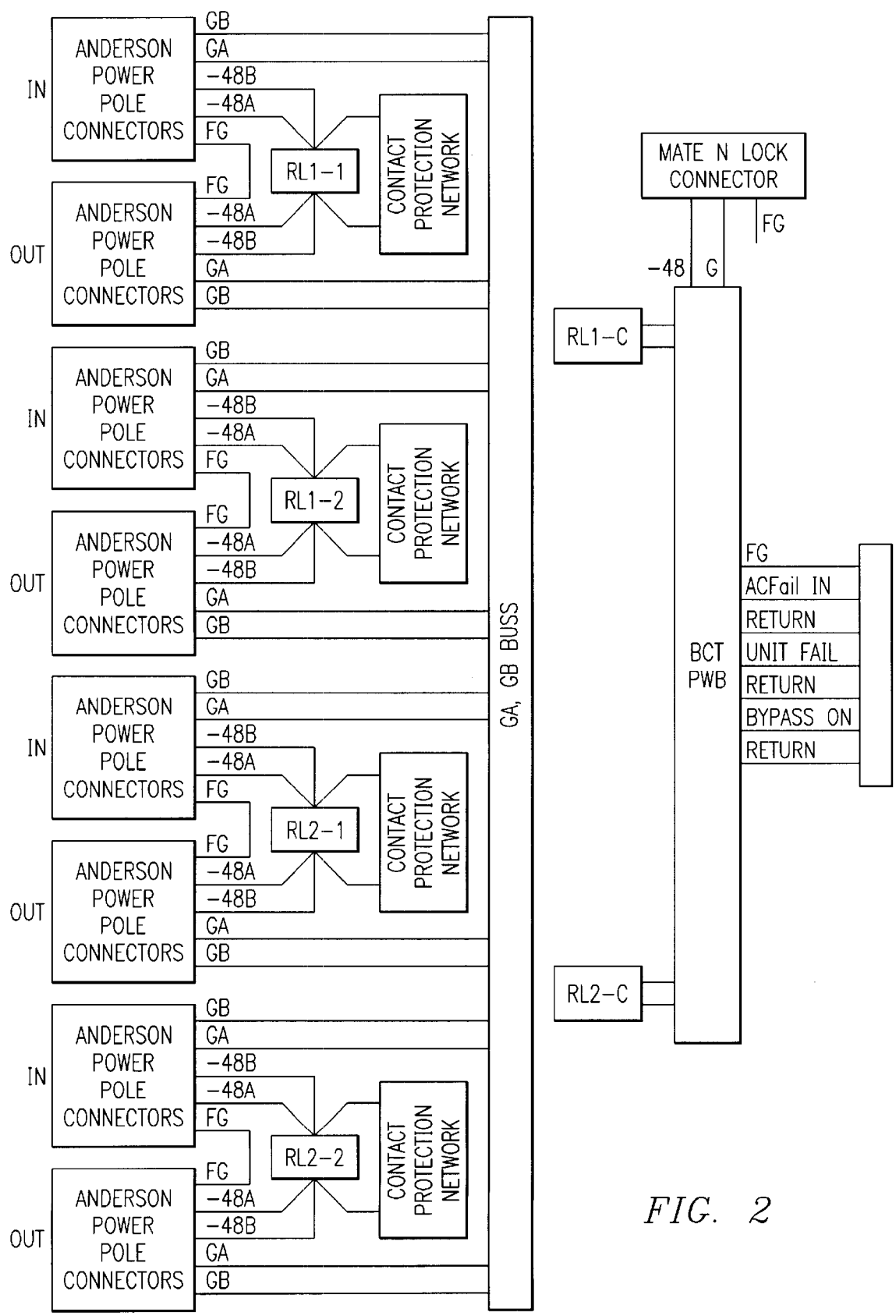
FIG. 2 provides a unitized block diagram of the battery cutoff timer of the present invention.
Figure 3A:
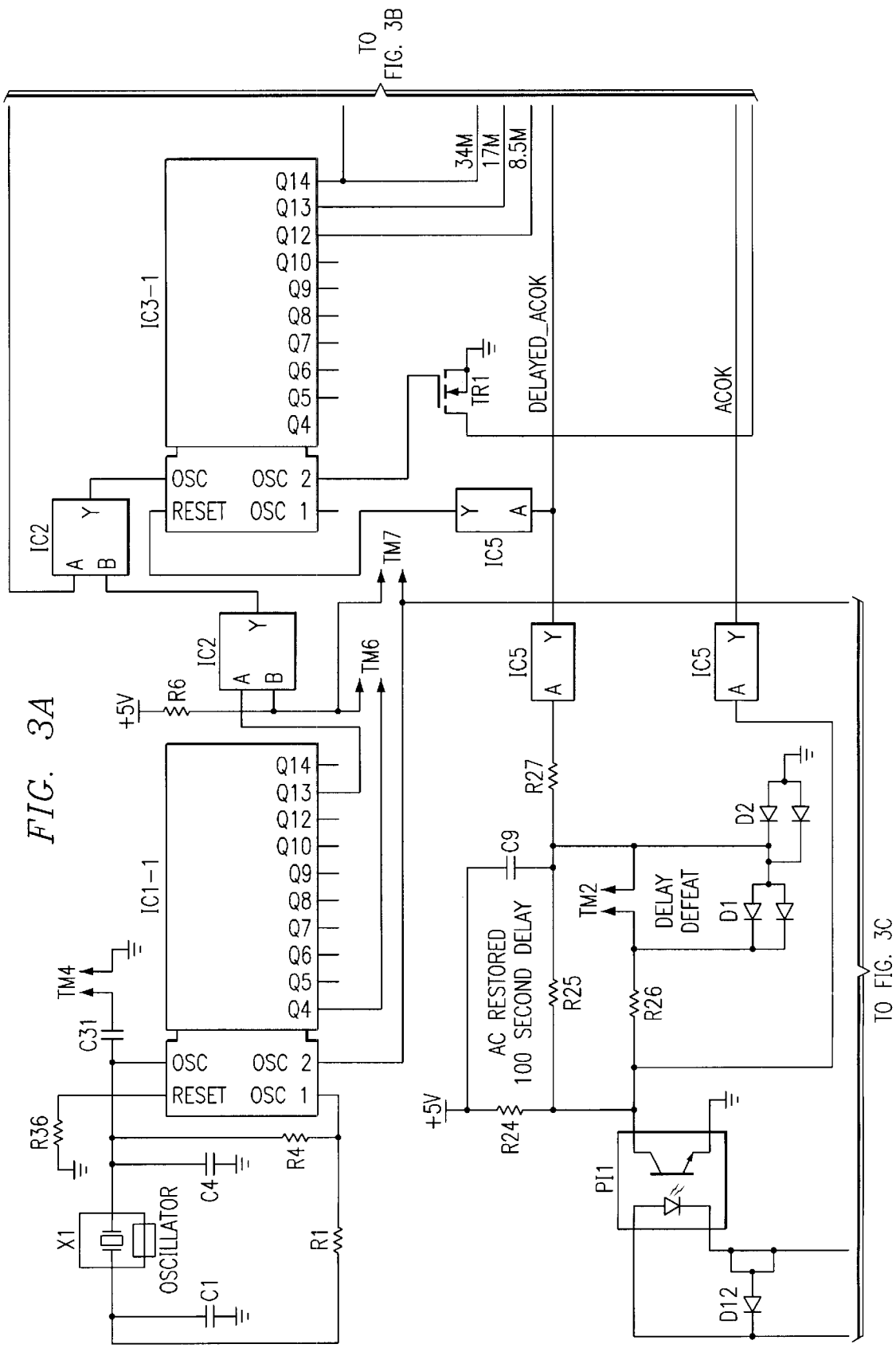
FIGS. 3A–3D provide an exemplary circuit diagram of an embodiment of the battery cuttoff timer of the present invention.
Figure 3B:
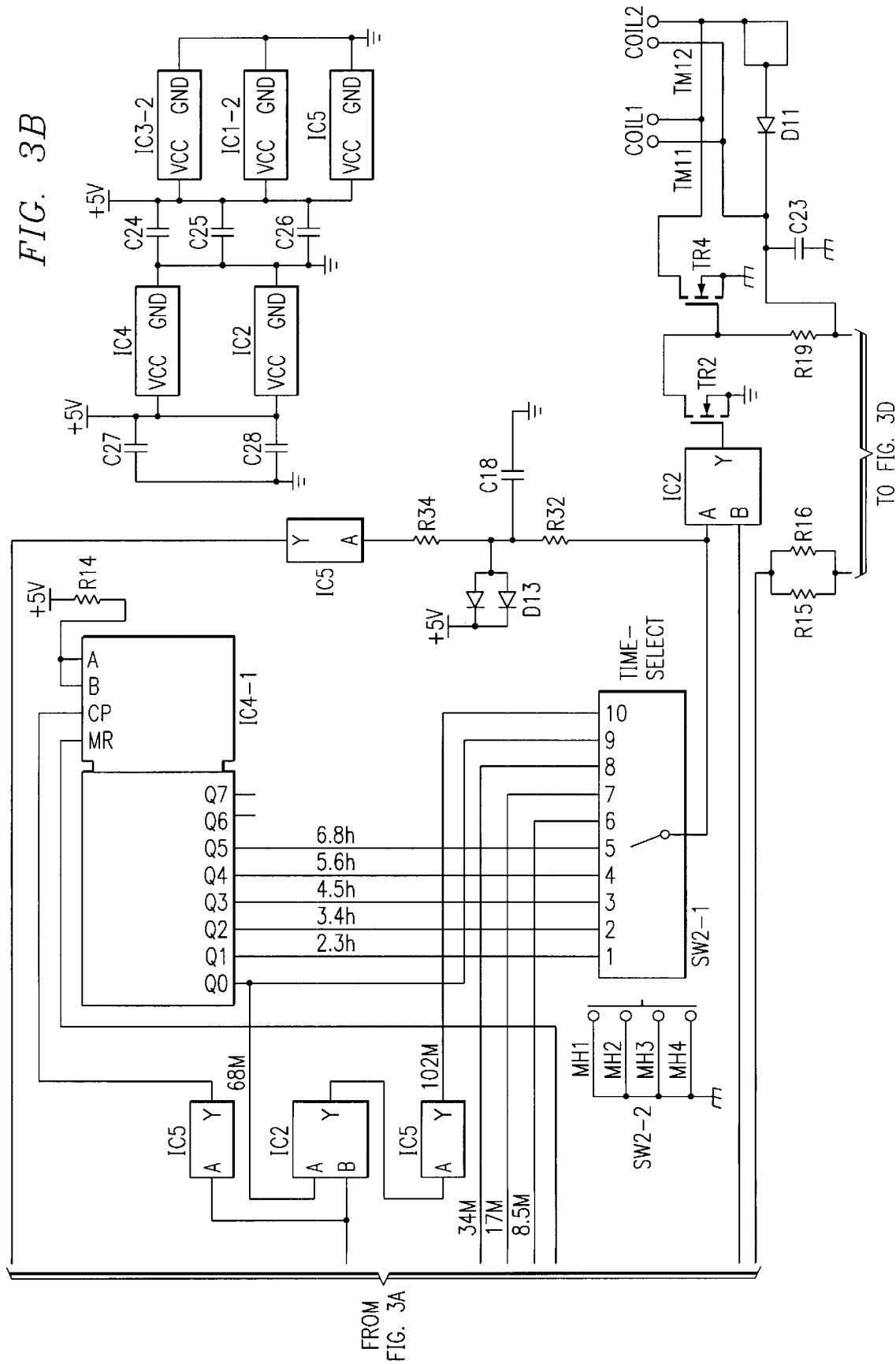
Figure 3C:
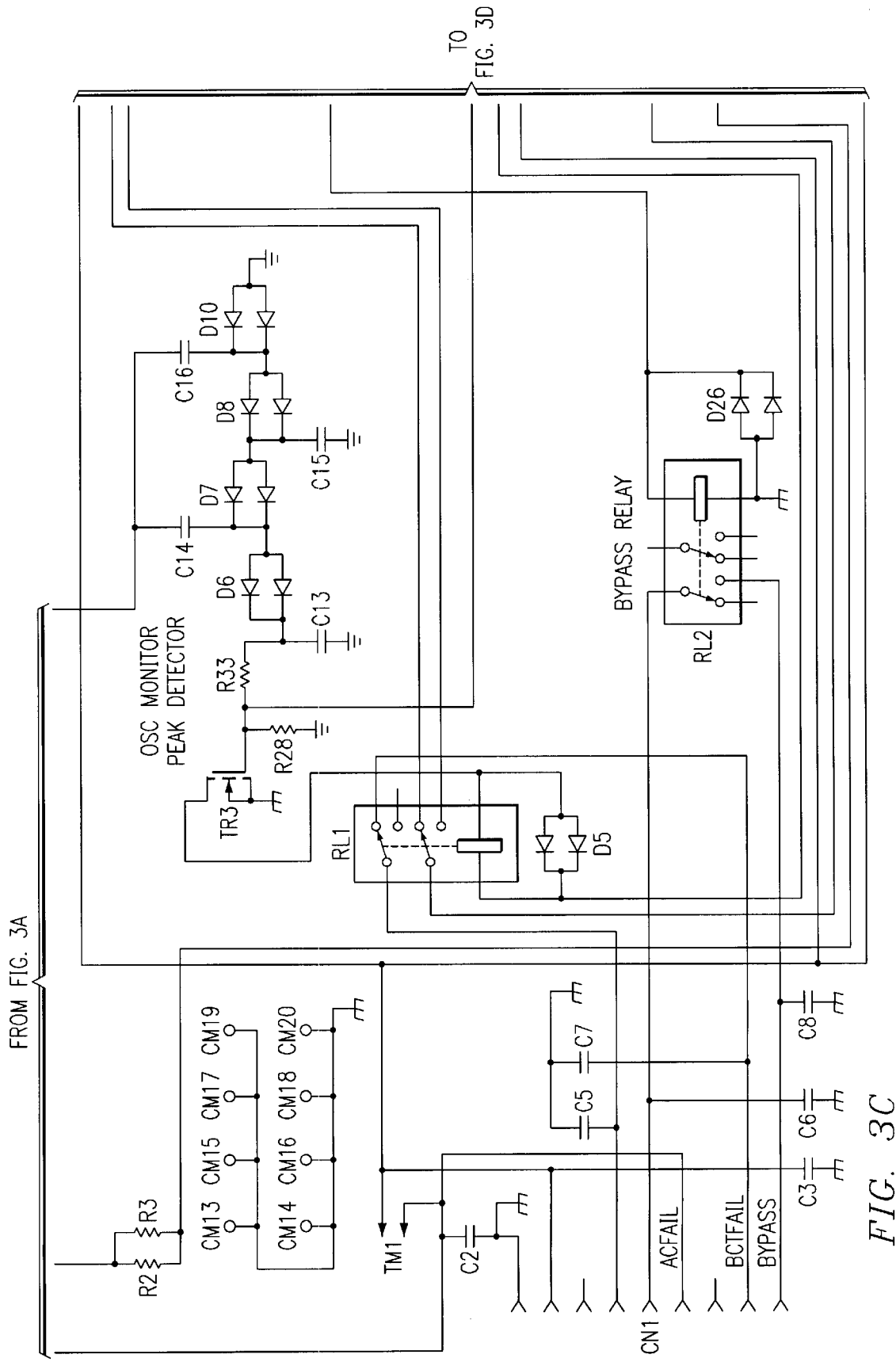
Figure 3D:
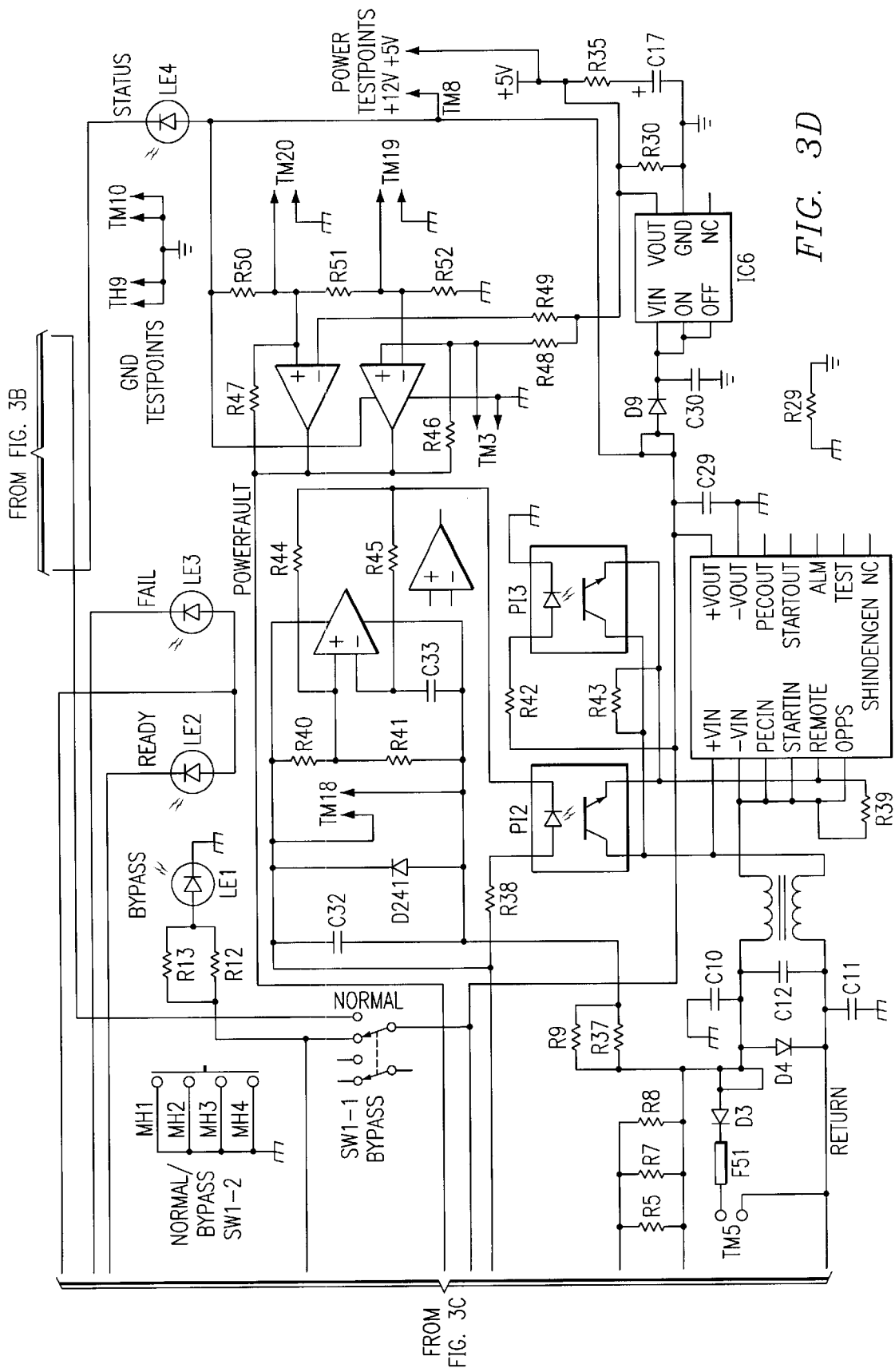
Figure 4:
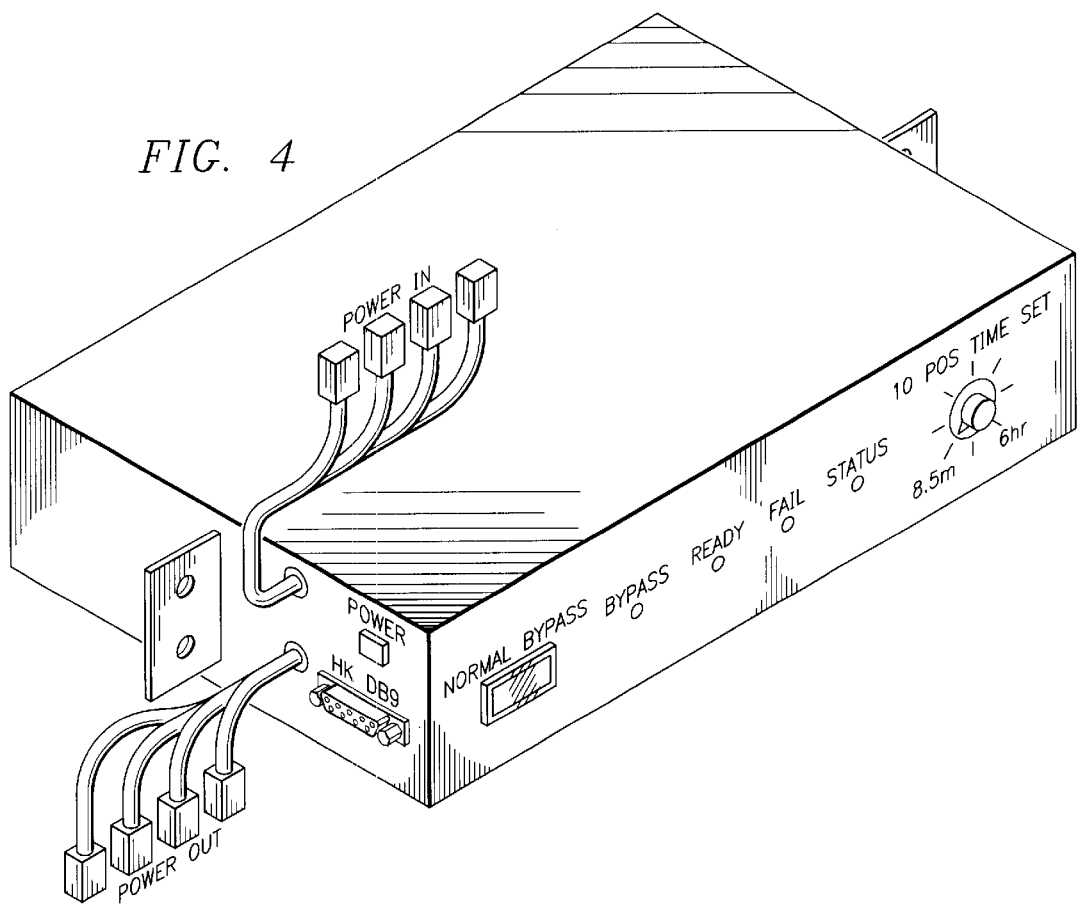
FIG. 4 provides an exemplary shelf layout of the battery cutoff timer of the present invention in one use.
Figure 5A:
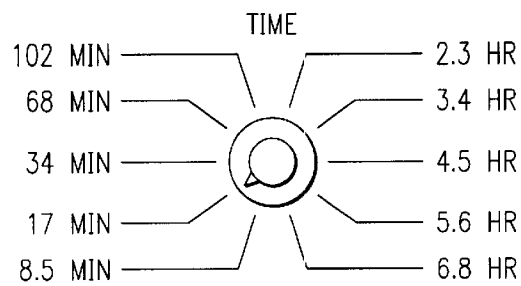
FIG. 5A–5D provides exemplary user-selectable switch settings for the battery cutoff timer of the present invention.
Figure 5B:
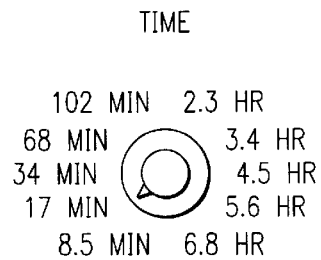
Figure 5C:
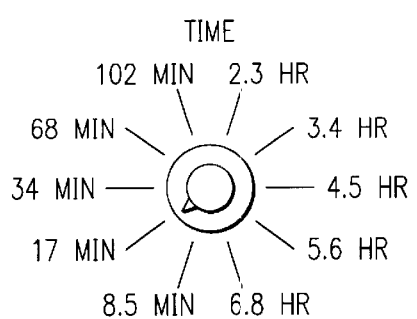
Figure 5D:
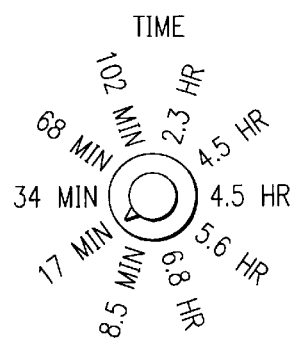

The Battery Cutoff Timer of the present invention, or BCT, controls up to four power circuits of 48VDC/13 Amp each to other units/shelves in, for example, (but not limited to) outdoor telephone company (telco) equipment cabinets. As described herein in connection with the presently preferred embodiments, the BCT is depicted in conjunction with a typical telecommunications network of the modern variety. Telecommunications equipment in present use typically may be driven by an external AC power source converted to DC power by appropriate transformers/rectifiers. On external detection of loss of AC power to the cabinet rectifiers, the BCT starts an internal timer whose time-out period is selected by a rotary switch and ranges from, in a typical application, 8.5 minutes to 6.8 hours. If the external AC power remains off for longer than the selected timeout period, the BCT interrupts the power to non-essential equipment (such as Speedport DSLAM shelves) to preserve the cabinet batteries for essential lifeline service. A BYPASS feature is provided to restore interrupted power or to prevent the interruption of power during maintenance. An alarm circuit monitors for correct power supply voltages and oscillator activity.

The BCT has eight Anderson connectors on dangler cables for controlled 48VDC input and output, one five pin mat'n'lok connector for 48V BCT power, one DB9 female connector for housekeeping, one NORMAL/BYPASS rocker switch, four display leds, and one 10 position rotary switch for timeout interval selection. Test jumpers, probe ground posts, and ICT testpoints are included internally on the PCB to aid in production test of the completed unit.

The BCT will operate over an ambient temperature range of −40 C. to +65 C. and an input voltage range of 38 to 60VDC. Power consumption is approximately 2 watts when not interrupting power, and 7 watts (room temperature) when interrupting power, decreasing by 10% when hot and increasing 30% when cold. BCT operating power is protected by an internal fuse. It can be mounted in either a 19 inch or 23 inch rack.

i.Circuit Functional Description

Power Supply

The 48 VDC input to the DC to DC converter is fuse and diode protected against reverse voltage and transients. A common mode choke and decoupling capacitors provide EMI filtering.

The DC to DC converter provides 12 volts output, which feeds a linear regulator which provides 5VDC for the timer logic. The 12VDC input to this regulator is diode/capacitor isolated to provide protection against power transients and dropouts.

The 12V and 5V supplies are monitored by an alarm circuit that is triggered if either supply becomes too high or too low.

A pair of marked probeholes in the pcb are provided as testpoints for the 12 and 5 volt supplies.

Input Optoisolator

Monitored through the BCT DB9 connector, an external contact closure to BATTERY RETURN (the positive, grounded side of the 48VDC power) signals the BCT that AC power to the rectifiers has failed. The BCT provides −48 volts current limited to 10 mA through an internal optical isolator to these contacts. This is done in the same manner as other Fujitsu products so multiple services can monitor the same contacts at the same time. A diode protects the optical isolator LED from reverse voltage due to other units sharing these contacts if the BCT is (temporarily) disconnected from the 48V battery supply.

A temporary jumper can be installed to simulate external contact closure testing if a test fixture is not available.

Input Delay

The timer starts when the AC power fails and the input sense circuit immediately releases the timer logic reset signal line. If the AC power should return before the timer has timed out, an RC network will delay approximately 1.5 minutes before the timer resets, which prepares it for a new timing cycle. This delay is incorporated to prevent unwanted timer reset on any brief, momentary returns of AC power—the power is required to remain on steady for the 1.5 minute interval before the BCT assumes all is well. Any power failures of longer than a half second during this 1.5 minute period will reset the delay to start all over, the AC must have no interruptions for the whole 1.5 minutes.

Timer Logic

A 32.768 KHz tuning fork type "watch" crystal forms the oscillator for a pair of binary ripple counters and a shift register which steps along a logic high. The first binary counter and its internal oscillator is free running at all times, the reset control is applied only to the second counter and the shift register. A rotary switch selects the desired output from either the counter or shift register or both logically combined; when this selected bit goes high at the end of the timed interval it returns a filtered stop signal to gate off the clock to the second binary counter, forcing the timer to hold its last state indefinitely (until reset by the return of AC power for more than 100 seconds). The RC filtering prevents contact bounce in the rotary switch (if rotated during the timing cycle) from falsely clocking the second binary counter and inadvertently shortening the timing interval.

The selected output also drives a transistor switch which grounds the coils of the externally mounted power relays, completing a 12VDC circuit. This causes the relays to open their contracts and interrupt the controlled power.

Two jumpers are provided to speed up the timer by a factor of 256 or 4096 to accelerate testing.

Alarm and Antihang Network

A relay is held energized by the presence of 12VDC to hold off the alarm signal to the DB9 connector when all is well. The state of this relay is also indicated by the panel READY or FAIL leds, operated from 48VDC so that the FAIL indicator shines even if the DC-DC converter fails.

The relay coil is controlled by a field effect transistor held on by a 4 to 5.5 VDC gate signal derived by peak detecting and voltage doubling (to overcome diode drop) of the crystal oscillator logic signal from the first binary counter. A failure of the crystal oscillator will cause the transistor gate voltage to drop, de-energizing the relay coil and causing contact closure and alarm indication. A test jumper can be installed to disrupt or interrupt the oscillator to test this function.

The 5 and 12 volt monitoring network is coupled to the gate of the same transistor; if either of the two open collector comparator outputs switch to a low level, they shunt the 4VDC and drive the transistor gate to ground to indicate an alarm. These two comparators form a window detector which compares the 5V supply with two references derived by dividing the 12V supply through a resistor string. If either supply should become excessively high or low the alarm is triggered. This guards against the possibility of a too-high or too-low 5V supply causing a counter failure which goes undetected (the oscillator may continue to work); or a too-low 12V supply which still maintains the 5V supply and holds in the alarm relay so that all appears normal, but cannot deliver enough voltage to pull in the power switching relays when called upon to do so. The resistor values have been chosen so that with the worst case opposite supply variation and resistor tolerances combined, the alarm will occur at some point between the following detection thresholds:

TABLE 1

Power Monitor Alarm Voltage Thresholds

| Supply Under Test | Normal Supply Range | Range* | | Range | |
|---|---|---|---|---|---|
| | | Too Low Detection | | Too High Detection | |
| 5 V | 4.875–5.125 | 4.171 | 4.632 | 5.245 | 5.80 |
| 12 V | 11.64–12.60 | 10.586 | 11.374 | 13.26 | 14.30 |

*For example, if the 12 V supply drops, the alarm is never active as long as the supply is above 11.374 V. However, the alarm is always active if the supply is below 10.586 V. Between these two levels, the alarm will become active, the exact level depending on the actual value of the 5 V supply which is being used as the reference. This technique assumes both supplies do not fail at the same time. Even if the 12 V supply drops to, say 4 V, the 5 V low-dropout regulator will output 3.8 V, the incorrect ratios will activate the alarm. This power monitor circuit works down to about 1 V (12 V) supply), below 2 V the Alarm relay coil will have released and activated the alarm.

The Shindengen brand DC to DC converter (also referred to as the power module) has a feature that causes it to shut down permanently (until input power is cycled off-on manually) if it detects an output overcurrent or overvoltage condition. There is a concern that this state could be triggered by a transient event such as ESD or lightning fields possibly conducted into the BCT on the power wiring. Whatever the mechanism, a power module that does not self-recover from a shutdown when the activating condition clears would require human intervention; this situation should be avoided.

To restart the power module from this hung condition, an anti-hang network consisting of a 0.5 Hz oscillator powered from a zener-regulated 12V supply directly off of the 48V input drives the led of an optical isolator whose switching transistor periodically opens then closes the connection between the power module's REMOTE pin and it's plus 48V input pin. This action causes the power module to restart as if it was shutdown or when power is first applied. Once the power module has started, it's own 12V output drives a second optoisolator in parallel with the first, which latches the REMOTE pin permanently to the plus 48V input pin, holding the power module continuously on. The anti-hang oscillator continues to run but no longer does anything useful.

If a true overload should actually occur, the power module, once started, shuts down again immediately to avoid overheating. The anti-hang oscillator is designed to operate at a slow rate to avoid forcing the power module into a high duty cycle under this condition.

A large value resistor is connected between the power module REMOTE and minus 48V input pins to reduce sensitivity. It was found that 600K between REMOTE and plus 48V is all that is required to turn on the power module; the resistor to minus 48V reduces this sensitivity and guards against the effects of optoisolator CE leakage.

R43 in parallel with the optoisolator transistors is currently unused. If the power module's permanent shutdown characteristic is ever re-designed out, the antihang network will no longer be needed and a 0 ohm jumper can be installed at R43 instead.

Bypass Mode

The purpose of this function is to defeat interruption of the controlled 48VDC. It operates by removing power to the power relay coils, thereby forcing the relays to release and close their contacts. This relay operation was selected so that a failure of the BCT internal power supply or a fuse-blowing circuit fault would not interrupt power to the controlled equipment; instead a BCT FAIL alarm indication is generated while controlled power (and DSLAM service) remains uninterrupted.

A rocker switch toggles between NORMAL and BYPASS modes. When in BYPASS, the 12V supply to the power relay coils is re-routed to a yellow warning led and the Bypass Relay (necessary because the rocker switch contacts are not rated beyond 28VDC) which presents a warning contact closure to an external monitor through the DB9 connector. In this mode the timer circuit is allowed to function as usual (i.e. resets on presence of or runs on loss of AC power), but the controlled 48VDC power is not interrupted regardless of the timer state. The timer circuit is not reset by invoking the BYPASS mode.

LEDS

There are four leds on the front panel—BYPASS (yellow), READY (green), FAIL (red), and STATUS (yellow).

The BYPASS led when lit indicates that the unit has been placed in the BYPASS mode described above. This led is not lit when in NORMAL mode.

The READY led indicates that the timer is powered and functioning to the extent the internal monitoring is capable of detecting any faults. Both the presence of correct voltage and current from the internal power supplies and the functioning of the crystal oscillator stage in the timer are required to light this led. Failure of either circuit will turn off the led, close alarm contacts wired to the DB9 connector for external monitoring, and turn on the FAIL led. The READY led will remain lit even when the BCT is placed in the BYPASS mode.

The FAIL led is turned on anytime the BCT is supplied with 48VDC operating power and the READY led is turned off due to failures described above.

The STATUS LED indicates the timer circuit status. When AC power is present and the timer is held in the reset state, this led will be off. When AC power fails this led will begin to flash 4 times per second to indicate the timer is running. When the timeout period has elapsed this led will light steadily. When AC power is restored this led will turn off after 1.5 minutes to indicate the timer is stopped and reset; before the 1.5 minutes has elapsed the led will continue flashing or light steadily depending on the timeout state. Invoking the BYPASS mode has no effect on this led or timer circuit status.

There is no led to indicate that controlled power is interrupted or restored. Leds on the controlled equipment provide this indication.

TABLE 2

LED/Contact Indications (blank = OFF, X = UNKNOWN)

| Indicator LED/Contacts | | Ready | Status | Fail | | Bypass | |
|---|---|---|---|---|---|---|---|
| Condition | Mode | Green | Yellow | Red | Contacts | Yellow | Contacts |
| AC OK | Normal | ON | | | OPEN | | OPEN |
| (after 1.5 minute delay) | Bypass | ON | | | OPEN | ON | CLOSED |
| AC failed-Timer running | Normal | ON | FLASH | | OPEN | | OPEN |
| | Bypass | ON | FLASH | | OPEN | ON | CLOSED |
| Timer finished, power interrupted | Normal | ON | ON | | OPEN | | OPEN |
| Timer finished, power not interrupted | Bypass | ON | ON | | OPEN | ON | CLOSED |
| Timer fault, power state unknown* | Normal | | X | ON or X* | CLOSED or X* | X | OPEN |
| Timer fault, power not interrupted | Bypass | | X | ON or X* | CLOSED or X* | X | CLOSED |

*There are several possible failure modes. For example, a fault in the timer circuit could freeze the timer in its last sate with controlled power either applied or interrupted. Other possibilities include a logic fault or transistor short which can interrupt controlled power and yet not result in lighting of the FAIL led. This type of fault is detectable in that the controlled equipment is, of course, inoperative. Another unlikely failure mode is an open transistor or logic fault which fails to interrupt power when required and which is not detectable through circuit monitoring (no FAIL led indication) while the BCT is not actually interrupting power.

Timeout Periods

A ten (10) position continuous rotation (no end stops) rotary switch is used to select the desired timeout interval. The timer will cycle once, then if AC power is not restored will stay locked at the end of its cycle.

Accidently rotating the switch after the timer has started will not cause errored timing as long as the switch is immediately returned to the same setting, or any setting greater than the length of time the timer has been running. If the switch is rotated to a position whose time has already elapsed, controlled power may or may not be interrupted and the timer may or may not continue running until up to the newly selected time has elapsed. Returning the switch to its original setting or any setting greater than the length of time the timer has been running will restore normal operation. Rotating the switch to a longer time position after the timer has stopped will restore controlled power and allow the timer to continue running until the new time selection has totally elapsed, starting from when the timer was first started but not including the time that it was stopped.

Time selections are listed in the following table. Times are in multiples of 17.066 (rounded to 17) minutes due to the binary-only division of the 32.768 KHz crystal time base.

TABLE 3

Timeout Interval Selection

| Knob Pointer Position (switch pin number) | Time minutes | Time hours: minutes | Time hours.hours exact | Time hours.hours rounded |
|---|---|---|---|---|
| 6 bottom left | 8.5 min | 0 hr :8.5 min | 0.1415 hr | 0.15 hr |
| 7 | 17 min | 0 hr :17 min | 0.283 hr | 0.3 hr |

TABLE 3-continued

Timeout Interval Selection

| Knob Pointer Position (switch pin number) | Time minutes | Time hours: minutes | Time hours.hours exact | Time hours.hours rounded |
|---|---|---|---|---|
| 8 | 34 min | 0 hr :34 min | 0.566 hr | 0.5 hr |
| 9 | 68 min | 1 hr :08 min | 1.133 hr | 1.1 hr |
| 10 top left | 102 min | 1 hr :42 min | 1.7 hr | 1.7 hr |
| 1 top right | 136 min | 2 hr :16 min | 2.266 hr | 2.3 hr |
| 2 | 204 min | 3 hr :24 min | 3.4 hr | 3.4 hr |
| 3 | 272 min | 4 hr :32 min | 4.533 hr | 4.5 hr |
| 4 | 340 min | 5 hr :40 min | 5.666 hr | 5.6 hr |
| 5 bottom right | 408 | 6 hr :48 min | 6.8 hr | 6.8 hr |

Relays and Contact Protection

Controlled power is switched by a pair of two pole relays with silver contacts rated at 125VDC at 20 amps for the four 48VDC 13 amp circuits (externally fused at 15 amps). The relays are operated simultaneously with their coils in parallel. Energizing the coils will result in interruption of controlled power; de-energizing the coils restores power to the controlled equipment.

Contact protection for DC power switching is achieved by an arc blowout magnet mounted near the relay contacts; the magnetic field generated by a DC arc on contact opening (which could last indefinitely, unlike AC current with the benefit of a zero crossing to extinguish the arc) in the presence of a static magnetic field causes the arc to move away from the contact and extinguish.

The relay contact loads (the Speedport DSLAM shelves) incorporate a slow start network on each of their 26 plug-in cards to eliminate high level transient input current surges, further protecting the relay contacts when they close. Each DSLAM card also has a large capacitor after it's slow-start network that absorbs any high voltage transients created by the inductive transformer of it's DC to DC converter when the relay contacts open. Because of this, no additional contact protection circuitry is required in the BCT.

As they are switching a much lower current (1 amp max), the Alarm and Bypass relays require no contact protection.

The clamp diode across each relay coil absorbs the inductive high voltage transient caused by switching off the coil current. Without this diode, the switching transistor would fail as a result.

Housekeeping and Alarms DB9 Connector

The female DB9 connector interfaces via cable to the external AC Fail contact closure, and provides access to the BCT FAIL ALARM and BYPASS ACTIVATED contact closures. These contacts are rated at 60VDC 1 amp resistive.

TABLE 4

Housekeeping Connector Pin Assignments

| | Pin | | |
|---|---|---|---|
| Frame Ground | 1 | | |
| | | 6 | External AC Fail Closure to Battery Return |
| Battery Return | 2 | | |
| | | 7 | |
| | 3 | | |
| | | 8 | BCT Fail Alarm Contact Closure |
| BCT Fail Alarm Contact Closure | 4 | | |
| | | 9 | BCT Bypass Contact Closure |
| BCT Bypass Contact Closure | 5 | | |

It will be evident to those of ordinary skill in the art that the above-described modes and embodiments of the present invention, while they disclose useful aspects of the present invention and its advantages, are illustrative and exemplary only, and do not describe or delimit the spirit and scope of the present invention, which are limited only by the claims that follow below.

We claim:

1. A battery cutoff timer for regulating electrical power flow among a plurality of loads, said timer comprising:
   a triggering device;
   a timer for selecting and timing at least one duration; and
   a power interrupter for selectably interrupting power flow to at least one of the plurality of loads upon elapsing of said at least one duration selected by said timer, wherein the plurality of loads are divided into critical loads and non-critical loads.

2. The timer of claim 1, wherein the first of the plurality of loads that is selectably interrupted is a non-critical load.

3. The timer of claim 2, wherein said triggering device is triggered by changes in logic state associated with a primary power supply input, and wherein the power flow that is interrupted by said power interrupter comprises power from a secondary power supply input.

4. The timer of claim 3, wherein the secondary power supply input comprises at least one storage battery.

5. The timer of claim 1, further comprising an automatic power restorer for restoring power flow to a load that has had power interrupted by said power interrupter.

6. The timer of claim 5, wherein:
   the triggering device is triggered by detecting a first change in a logic state associated with a power input for the electrical power flow; and
   the automatic power restorer restores power to the load that has had power interrupted in reaction to a second change in the logic state.

7. The timer of claim 5, wherein:
   the triggering device is triggered by detecting a first change in an on/off state for electrical current flow in a power supply unit; and
   the automatic power restorer restores power to the load that has had power interrupted in reaction to a second change in the on/off state.

8. The timer of claim 1, wherein the triggering device is triggered by detecting a first change in a logic state associated with a power input.

9. The timer of claim 8, wherein the power input comprises a primary power supply input.

10. The timer of claim 9, wherein the primary power supply input comprises AC power derived from a public utility power grid.

11. The timer of claim 8, wherein the power input comprises a backup power supply input.

12. The timer of claim 11, wherein the backup power supply input comprises at least one storage battery.

13. The timer of claim 1, wherein the triggering device is triggered by detecting a first change in an on/off state for electrical current flow in a power supply input.

14. A battery cutoff timer for use with a plurality of data communications devices, the communications devices being divided into critical devices and non-critical devices, all of said devices configured to be powered at least in part by storage battery power during unavailability of primary power input, said timer comprising:
   (a) a monitor device for monitoring the availability of primary power input for the data communications equipment;
   (b) an alarm device for sensing a failure event in primary power for the data communications equipment;
   (c) a timing device for being initiated by said alarming device and for counting-down a predetermined time interval following the failure event;
   (d) a cutoff device for cutting off storage battery power to at least one non-critical device upon elapsing of such predetermined time interval during continuation of unavailability of primary power input; and;
   (e) a power restoring device for restoring primary input power to the at least one non-critical device upon resumption of availability of primary power input.

15. The timer of claim 14, wherein:
   the monitor device monitors a logic state associated with the primary power input; and
   the failure event comprises a first change in a logic state associated with the primary power input.

16. The timer of claim 15, wherein the power restoring device restores primary power in response to a second change in the logic state.

17. The timer of claim 14, wherein the primary power input comprises AC power derived from a public utility power grid.

18. The timer of claim 14, wherein:
   the monitor device monitors an on/off state for electrical current flow from the primary power input; and
   the failure event comprises detecting the off state for the electrical current flow of the primary power input.

19. The timer of claim 18, wherein the power restoring device restores power in response to detecting the on state of the primary power input.

20. The timer of claim 14, wherein:

the power restoring device is operable to determine whether the primary power input has been available for a predetermined duration; and the power restoring device is further operable to restore the primary input power to the non-critical devices in response to determining that the primary power input has been available for the predetermined duration.

21. A method of regulating electrical power flow among a plurality of loads, said method comprising:

providing a plurality of loads coupled to a primary power input source, the plurality of loads divided into critical and non-critical loads;

monitoring input of electrical power for the loads from the primary power input source;

selecting at least one duration;

triggering a timer to count down the duration upon occurrence of a change in a logic state associated with the primary power input source;

selectably interrupting power flow to at least one non-critical load upon elapsing of said at least one duration counted down by said timer.

22. The method of claim 21, further comprising the steps of:

after the power flow is interrupted, detecting a return of the logic state to an initial state; and in response to detecting the return of the logic state to the initial state, automatically restoring power flow to the at least one non-critical load that has had power interrupted.

23. The method of claim 21, wherein:

the logic state comprises an on/off state for electrical current flow from the primary power source; and the step of triggering comprises triggering in response to detecting the off state of the electrical current flow from the primary power source.

24. The method of claim 21, wherein the step of triggering occurs contemporaneously with supplying a secondary storage battery power supply input source for the plurality of loads and the step of selectably interrupting power flow comprises interrupting power flow from the secondary battery power supply input source.

* * * * *

UNITED STATES PATENT AND TRADEMARK OFFICE
CERTIFICATE OF CORRECTION

PATENT NO.   : 6,445,163 B1
DATED        : September 3, 2002
INVENTOR(S)  : E. Glen Chenier et al.

It is certified that error appears in the above-identified patent and that said Letters Patent is hereby corrected as shown below:

Column 2,
Line 2, after "certain", delete "modem" and insert -- modern --.

Column 5,
Line 13, after "display", delete "leds" and insert -- LEDs --.
Line 43, after "the", delete "pcb" and insert -- PCB --.

Column 6,
Line 30, after "their", delete "contracts" and insert -- contacts --.
Line 38, after "FAIL", delete "leds" and insert -- LEDs --.

Column 8,
Line 16, after "warning", delete "led" and insert -- LED --.

Column 9,
Line 25, after "last", delete "sate" and insert -- state --.

Column 14,
Line 10, after "claim", delete "21" and insert -- 22 --.

Signed and Sealed this

Nineteenth Day of August, 2003

JAMES E. ROGAN
*Director of the United States Patent and Trademark Office*